United States Patent
Chatani

(10) Patent No.: US 7,171,402 B1
(45) Date of Patent: Jan. 30, 2007

(54) DYNAMIC INTERACTIVE CONTENT SYSTEM

(75) Inventor: Masayuki Chatani, Sunnyvale, CA (US)

(73) Assignee: Sony Computer Entertainment America Inc., Foster City, CA (US)

( * ) Notice: Subject to any disclaimer, the term of this patent is extended or adjusted under 35 U.S.C. 154(b) by 403 days.

(21) Appl. No.: 10/264,087

(22) Filed: Oct. 2, 2002

(51) Int. Cl.
G06F 7/00 (2006.01)
G06F 17/30 (2006.01)

(52) U.S. Cl. .............................................. 707/3; 707/10
(58) Field of Classification Search ............. 707/104.1, 707/3, 10
See application file for complete search history.

(56) References Cited

U.S. PATENT DOCUMENTS

| | | | | |
|---|---|---|---|---|
| 5,778,367 A | * | 7/1998 | Wesinger et al. | 707/10 |
| 6,351,599 B1 | * | 2/2002 | Komeno | 386/70 |
| 2001/0042107 A1 | * | 11/2001 | Palm | 709/218 |
| 2002/0042920 A1 | * | 4/2002 | Thomas et al. | 725/87 |

FOREIGN PATENT DOCUMENTS

| | | |
|---|---|---|
| EP | 1 219 332 A2 | 3/2002 |
| EP | 1 184 061 A1 | 6/2002 |
| WO | WO 2054327 A1 * | 7/2002 |
| WO | WO 02/054327 A1 | 11/2002 |

* cited by examiner

*Primary Examiner*—Uyen Le
*Assistant Examiner*—Cheryl M Shechtman
(74) *Attorney, Agent, or Firm*—Martine Penilla & Gencarella, LLP

(57) ABSTRACT

An invention is provided for a dynamic interactive content system. The dynamic interactive content system includes a receiver capable of receiving main content, such as audio/visual video data, and supplemental content associated with the main content. In addition, a persistent storage is included that is in communication with the receiver. The persistent storage is capable of storing a plurality of main content entries and associated supplemental content entries. The system also includes a processor that is capable of executing an interactive application. In operation, the interactive application searches the stored plurality of supplemental content entries for particular supplemental content entry having particular data. The interactive application then presents at least a portion of the main content entry that is associated with the particular supplemental content to a user.

12 Claims, 7 Drawing Sheets

DYNAMIC INTERACTIVE CONTENT SYSTEM

BACKGROUND OF THE INVENTION

1. Field of the Invention

This invention relates generally to interactive content systems, and more particularly to interactive content systems having integrated personal video recording functionality.

2. Description of the Related Art

Currently, interactive content systems, such as game consoles, provide utility and entertainment mechanisms to individuals worldwide. For example, interactive content systems allow users to view digital videodiscs (DVDs), play interactive entertainment software, and browse the Internet. In addition, interactive content systems provide exciting learning environments through educational interactive software.

FIG. 1 is a block diagram showing a typical prior art interactive content system 100. The prior art interactive content system 100 generally includes a central processing unit (CPU) 102 coupled to a system bus 104, which connects a plurality of system components. For example, the system bus 104 often is connected to a graphics processing unit (GPU) 106, an operational request source 108, a memory 110, a removable media drive 112, and video/audio output circuitry 114.

In operation, removal media such as a compact disc (CD) or digital videodiscs (DVD) is placed into the removal media drive 112, which reads data from the CD and transfers program information to the memory 110. The CPU 102, in conjunction with the GPU 106, executes the program instructions from memory to execute the program. In addition, the operational request source 108 typically is in communication with a user input device, such as a game controller, remote controller, keyboard, or other device capable of receiving and transferring user input data to the interactive content system 100. Output from the program executing on the CPU 102 generally is provided to the video/audio output circuitry 114 for presentation, typically on television or other monitor and speaker system.

In this manner, users are able to interact with the information presented to them via the operational request source 108. However, as can be appreciated, the user is limited to interacting with the static information provided from the removable media via the removable media drive 112. For example, when utilizing sport based entertainment software, current sporting results cannot be included in the entertainment environment provided by the interactive content system 100. Further, educational information is restricted to information available at the time the removable media is manufactured. As a result, events and discovers occurring after the manufacture of the removable media are not available to the user using the interactive content system 100.

Although systems are available that provide a user access to current events, such as personal video recording (PVR) units, these systems generally do not provide a user with an engrossing interactive environment. For example, a PVR system, which records current broadcasts as they occur, can generally only be utilized to rewind, pause, and playback the recorded events. The user only is allowed to passively watch the events as they are presented to them. That is, the user is not allowed to interact with content, as in an interactive content system.

In view of the foregoing, there is a need for an interactive content system that allows dynamic media to be utilized in conjunction with the interactive content. The system should allow current content from sources such as network broadcasts and other content providers, to be utilized in conjunction with interactive applications.

SUMMARY OF THE INVENTION

Broadly speaking, the present invention fills these needs by providing a dynamic interactive content system that combines dynamic media with interactive content using prerecorded visual and audio data. The system allows content from sources such as network broadcasts and other content providers, to be utilized in conjunction with interactive applications.

In one embodiment, a dynamic interactive content system is disclosed. The dynamic interactive content system includes a receiver capable of receiving main content, such audio/visual video data, and supplemental content associated with the main content. In addition, a persistent storage is included that is in communication with the receiver. The persistent storage is capable of storing a plurality of main content entries and associated supplemental content entries. The system also includes a processor that is capable of executing an interactive application. In operation, the interactive application searches the stored plurality of supplemental content entries for a particular supplemental content entry having particular data. The interactive application then presents at least a portion of the main content entry that is associated with the particular supplemental content entry to a user. Generally, each supplemental content entry can include data that describes properties of the associated main content entry. For example, the data can include a channel definition defining a channel utilized to receive the associated main content, and a time definition defining a time when the associated main content was received. In addition, the data can include a time code for a specific event included in the associated main content. In this case, the interactive application can present main content data beginning at a position in the main content entry specified by the time code.

A further dynamic interactive content system is disclosed in an additional embodiment of the present invention. As above, the dynamic interactive content system includes a receiver capable of receiving main content and supplemental content associated with the main content. In addition, a persistent storage is included that is in communication with the receiver. As above, the persistent storage is capable of storing a plurality of main content entries and associated supplemental content entries. Further, an operational request source is included that is in communication with a user input device. The operational request source is capable of receiving user requests via the user input device. The system also includes a processor that is in communication with the persistent storage device and the operational requests source. In operation, the processor searches the stored plurality of supplemental content entries for particular supplemental content entry having particular data related to a received user request. The processor can then present at least a portion of the main content entry associated with the particular supplemental content entry to a user. In addition, the processor can be further capable of executing an interactive application, as described above.

A method for providing dynamic interactive content is disclosed in a further embodiment of the present invention. The method includes receiving a plurality of main content and supplemental content associated with the main content.

The plurality of main content and associated supplemental content are stored. Further, the plurality of supplemental content is searched for particular content having specific data. The main content associated with the particular supplemental content is then presented to a user using an interactive application capable of responding to user input data. In one aspect, the supplemental content can be received via a web site on the Internet. For example, the web site can include an index associated with a supplemental content database. In this case, the supplemental content database can be searched using the index to obtain a supplemental content entry. As above, the data included in the supplemental content can include both a channel definition defining a channel utilized to receive the associated main content and a time definition defining a time when the associated main content was received. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for a dynamic interactive content system that combines dynamic media with interactive content using prerecorded visual and audio data. The system allows content from sources such as network broadcasts and other content providers, to be utilized in conjunction with interactive applications. Broadly speaking, embodiments of the present invention record main content, such audio/visual video data, from content providers, such as network and satellite broadcasts, on a persistent storage such as a hard drive. Along with the main content, supplemental data is recorded that describes the main content. For example, the supplemental data can include information such as when the main content was recorded, the channel it was received from, and the type of material that was recorded, such as whether the main content is a movie or sporting event. By searching the supplemental data, interactive applications can search for specific main content for use in the application. In this manner, interactive applications can utilize current broadcasts and other material in their user presentations.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention. Further, the term "main content" will be utilized in the following description to indicate any data usable in an interactive application. For example, main content can be audio/visual data, such as a television or cable television program. Main content can also indicate audio data recorded from an audio source, such as a commercial radio broadcast network. Other examples of main content can include, for example, MPEG data or other image data recorded from a wide area network such as the Internet, and other data types usable in interactive applications that will be apparent to those skilled in the art after a careful reading of the present disclosure. In addition, the terms "presentation" and "presentation data" will refer to any data presented to the user. As such, presentation data can include video, image, and/or audio data that is presented to the user, for example, using a television, monitor, and/or speakers.

Figure 1:
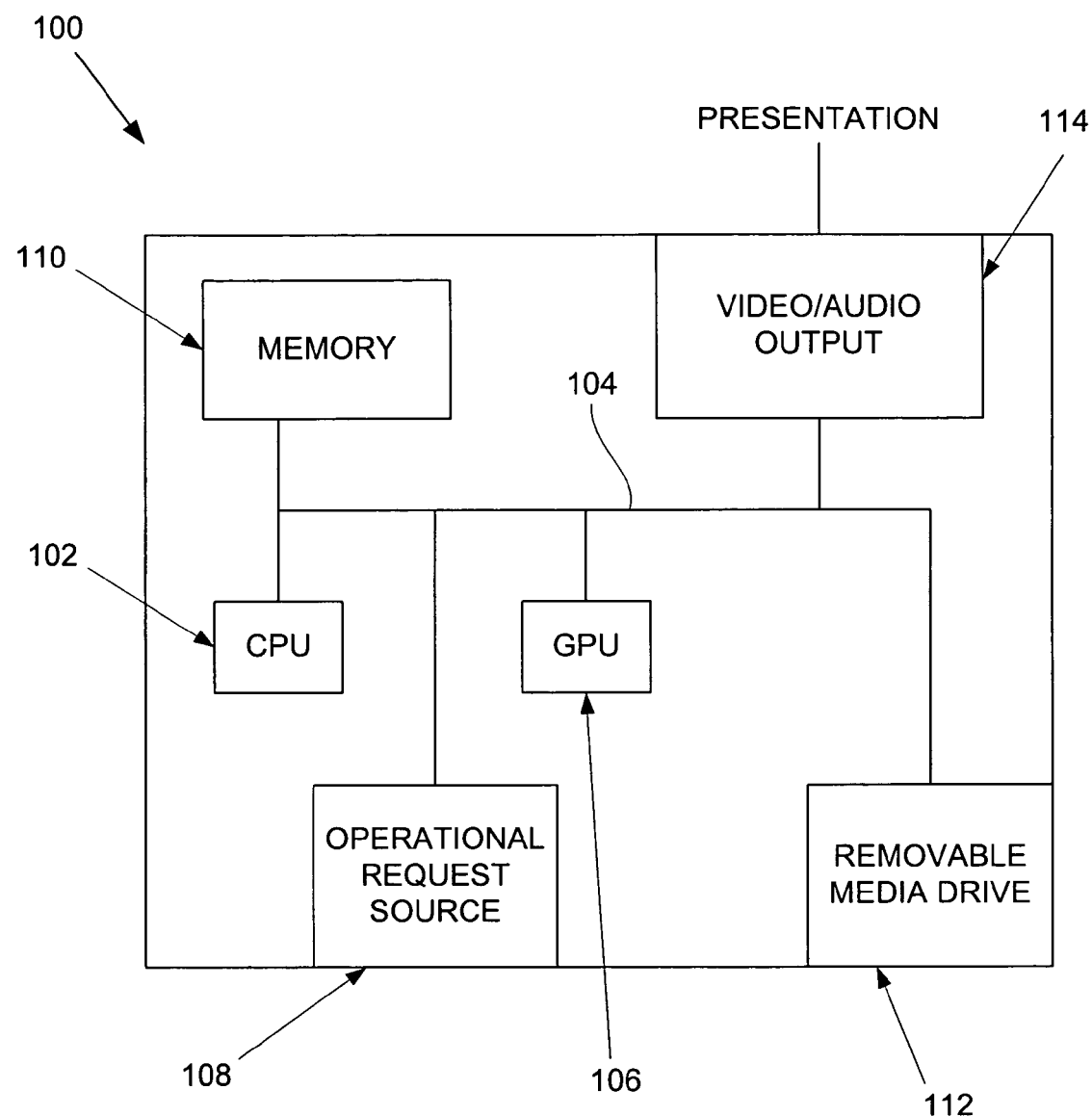
FIG. 1 is a block diagram showing a typical prior art interactive content system.
Figure 2:
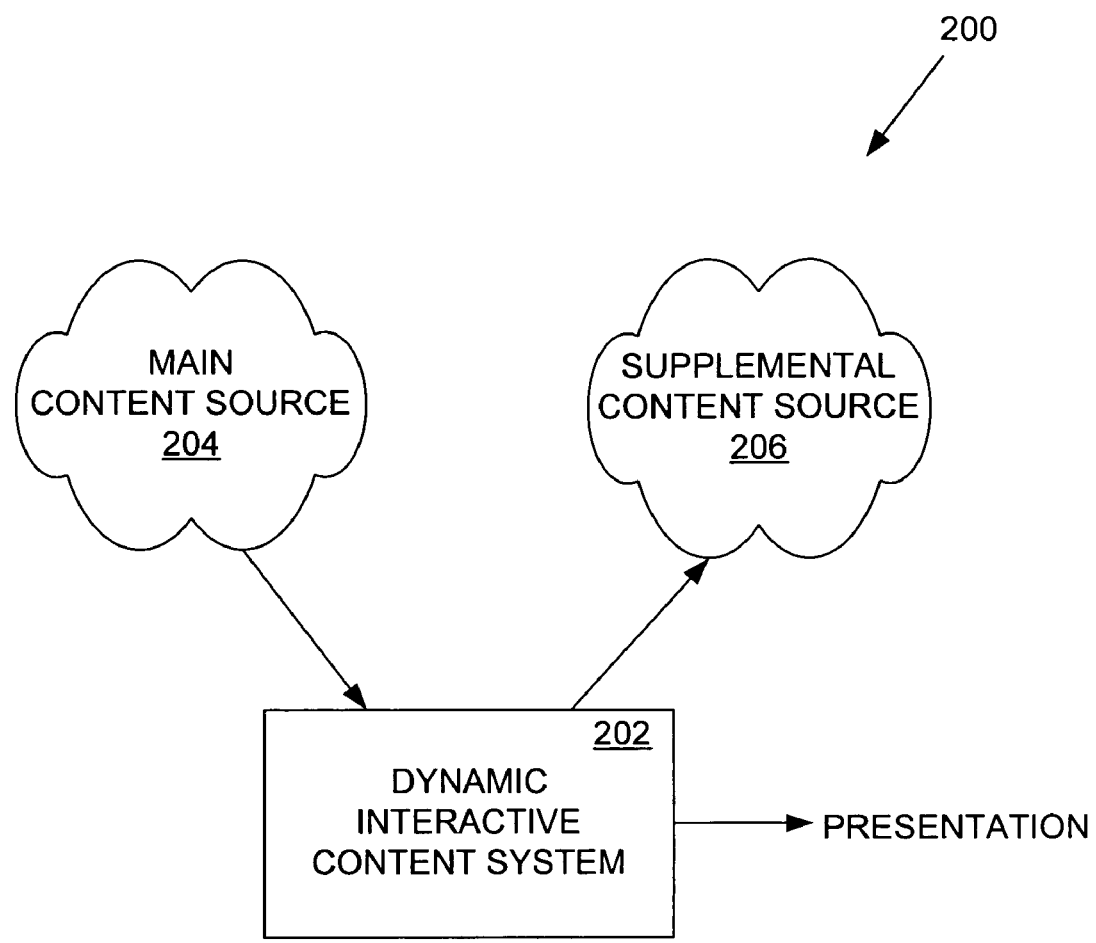
FIG. 2 is a diagram showing a dynamic interactive content environment, in accordance with an embodiment of the present invention.

FIG. 2 is a diagram showing a dynamic interactive content environment 200, in accordance with an embodiment of the present invention. The dynamic interactive content environment 200 includes a dynamic interactive content system 202 in communication with a main content source 204, such as a broadcast network. The main content source 204 can be any network capable of providing main content, such as a broadcast network, cable station, premium satellite provider, radio station, or any other source capable of providing main content. In addition, the dynamic interactive content system 202 can be in communication with a supplemental content provider 206, such as the Internet or other a wide area network 206. It should be borne in mind, as explained in greater detail below, that the supplemental content provider 206 can be the same source as the main content provider 204, for example, by embedding the supplemental content within the main content signal.

As mentioned above, embodiments of the present invention allow main content, such as audio/visual video data from the main content source 204, to be utilized in conjunction with interactive applications. By recording main content on a persistent storage device and providing a description of the main content using the supplemental content, embodiments of the present invention allow interactive applications to utilize the recorded main content during their user presentations.

For example, embodiments of the present invention can record a sporting event from a main content source 204, such as a broadcast network. Then, an interactive application executing on the dynamic interactive content system 202 can utilize particular elements of the sporting event during its execution. For example, an interactive football game application can utilize segments of a prerecorded football game to display to the user, thus increasing the realism of the interactive experience.

In particular, embodiments of the present invention receive main content from main content sources 204, such as a broadcast network, and supplemental content from a supplemental content sources 206, such as the Internet. The received main content then is stored on a hard drive or other persistent storage device within the dynamic interactive content system 202. In addition, the dynamic interactive content system 202 receives supplemental content that is related to the main content from either the supplemental content source 206 and/or the main content source 204.

The supplemental content includes information describing the main content. For example, the supplemental data can include the time the main content was recorded and the channel or URL providing the main content. The supplemental data can further include the type of the main content and time codes for particular scenes in the main content. For example, the supplemental content can indicate a particular program is a movie and a particular scene, such as a chase scene, is located at a particular time code, such as thirty minutes and ten seconds into the movie. As mentioned above, and described in greater detail subsequently, the supplemental content can be embedded in the main content signal and/or located at a separate supplemental content source 206, such as at a web site.

Broadly speaking, the dynamic interactive content system 202 associates the supplemental content with the main content that the supplemental data describes. In this manner, applications can search the supplemental content stored on the persistent storage device to find main content having particular characteristics. For example, an interactive application may need a car chase scene to enhance the visual experience of a racing game. In this case, the application can search the supplemental data of the persistent storage for car chase scenes. Once found, the application can read the selected supplemental data to determine the time code for the car chase, and then display the associated main content to the user starting at the particular time code of the chase scene. Thus, the user can experience the video of the prerecorded car chase while utilizing the interactive application.

Figure 3:
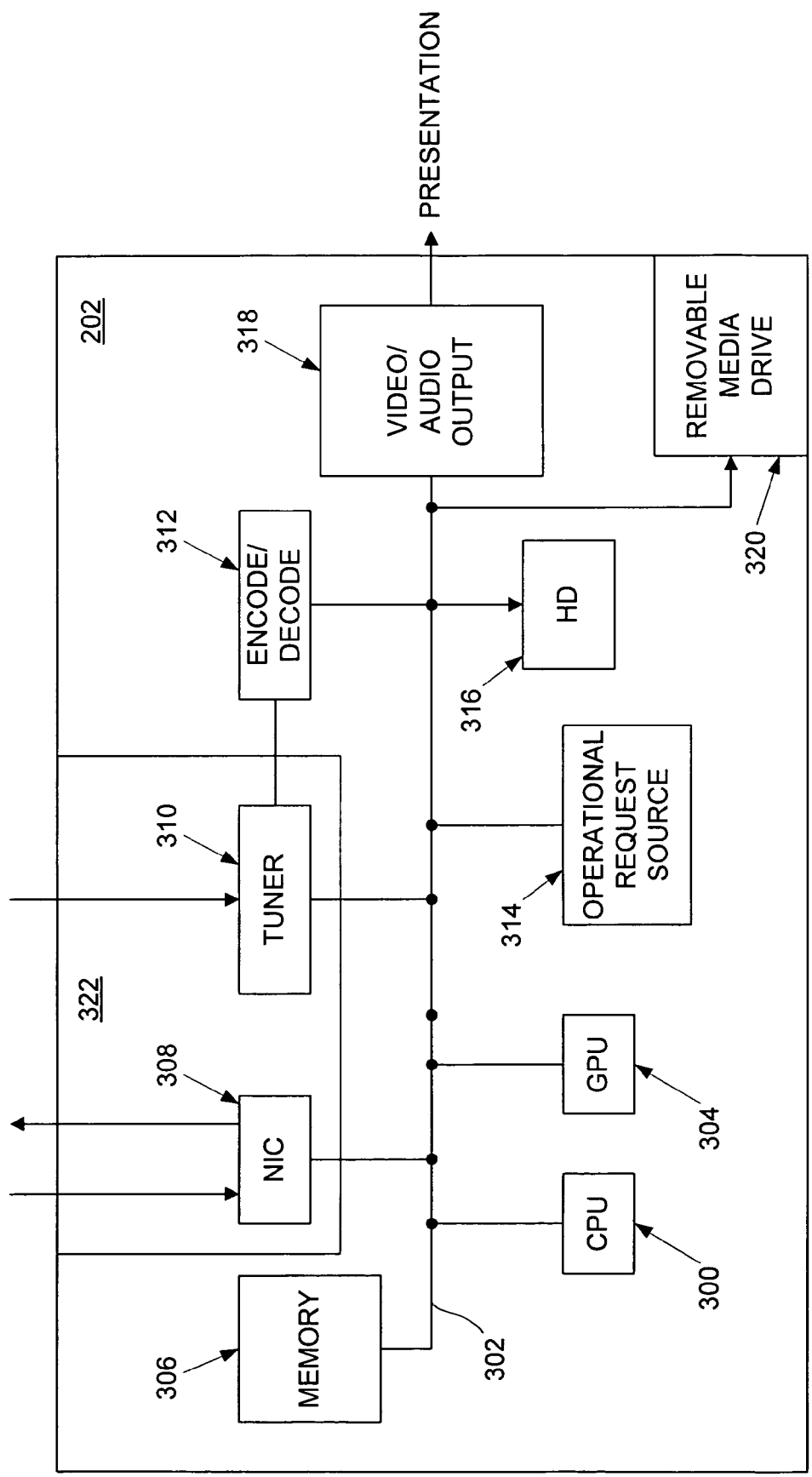
FIG. 3 is a block diagram showing an exemplary dynamic interactive content system, in accordance with an embodiment of the present invention.

FIG. 3 is a block diagram showing an exemplary dynamic interactive content system 202, in accordance with an embodiment of the present invention. As shown in FIG. 3, the dynamic interactive content system 202 includes a CPU 300 coupled to a system bus 302, which connects a plurality of system components. For example, the system bus 302 is coupled to a GPU 304, memory 306, and a receiver 322 having a network interface card 308 and a tuner 310. In addition, the system bus 302 can be coupled to an encode/decode signal processor 312, an operational request source 314, a persistent storage device 316, video/audio output circuitry 318, and a removable media drive 320.

As mentioned above, the dynamic interactive content system 202 records main content for use in interactive applications. Specifically, the receiver 322 is utilized to receive and route main content and supplemental content signals to the appropriate modules of the dynamic interactive content system 202. As shown in FIG. 3, the exemplary receiver 322 can include both a network adapter 308, such as a network interface card (NIC), and a tuner 310.

The tuner 310 can be utilized to lock on to a selected carrier frequency, for example from a television station or radio channel, and filter out the audio and video signals for amplification and display. As such, the tuner 310 can be utilized in conjunction with an antenna, satellite dish, cable outlet, or other transmission receiving source capable of carrying signals from a main content source to the tuner 310. Once received, main content is stored utilizing a persistent storage device, such as the hard drive 316.

Received data often is encoded into a particular file format, for example MPEG format, prior to recording the data on the hard drive 316. This typically is accomplished using an encoder/decoder unit 312, which is capable of encoding data into a particular file format and decoding data files for presentation. For example, in one embodiment, main content received utilizing the tuner 310 can be provided to the encoder/decoder unit 312, which can encode the main content and then provide the encoded main content to the hard drive 316. In addition, the tuner 310 can provide the main content to the video/audio output circuitry 318, which can display the main content to the user. During subsequent usage, the CPU 300 can transmit a command to the encoder/decoder unit 312 which requests the encoder/decoder unit 312 to read the encoded main content from the hard drive 316. The encoder/decoder unit 312 then can decode the previously encoded data and provided the decoded data to the video/audio output circuitry for presentation to the user.

Main content also can be received utilizing the NIC 308. For example, an MPEG video or WAV audio file can be downloaded from a main content source such as a web page on the Internet. In this case, the received main content may not require encoding prior to being recorded on the hard drive 316. For example, when the main content is an MPEG video, the MPEG data generally can be saved directly to the hard drive 316. Upon retrieval, the dynamic interactive content system 202 can again utilize the encoder/decoder unit 312 to decode the stored data prior to providing the main content to the video/audio output circuitry 318. In this manner, main content can be stored and retrieved from the hard drive 316 as needed.

As mentioned previously, embodiments of the present invention receive supplemental content in addition to main content. Supplemental content provides information describing aspects, properties, and/or characteristics of a particular main content file. For example, supplemental content can include information such as the channel on which the main content was received, the time it was received, and a description of the scenes or frames included in the main content. In addition, more detailed information can be included in the supplemental content, such as the time code or frame ranges of particular scenes or events within the main content.

For example, when the main content is a video of an auto race, the supplemental content may include, for example, the channel on which the auto race was broadcast, the time of the broadcast, information on the drivers involved, and description of the events that occurred during the race, such when a car loses control and spins out or the end of the race. In addition, the supplemental content can include the time codes of each of these events, for example, the supplemental content can indicate that a spinout occurred fifteen minutes and twenty seconds into the race.

The supplemental content can be received either from the main content source or from a separate supplemental content source. When received from the main content source, the supplemental content typically is embedded into the main content signal. For example, supplemental content can be carried in the vertical blanking interval (VBI) of a television (TV) frame, as discussed next with reference to FIG. 4.

Figure 4:
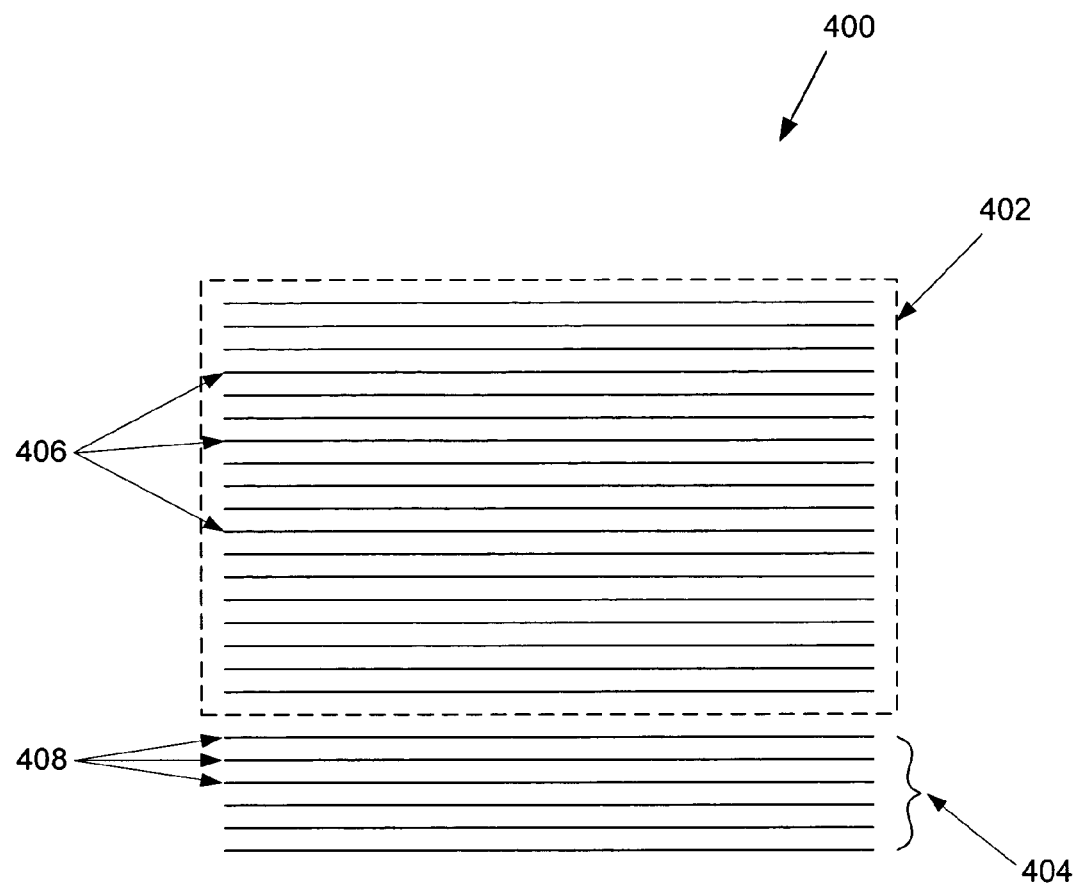
FIG. 4 is an illustration showing a conventional TV frame, which includes a viewable area and a non-viewable VBI.

FIG. 4 is an illustration showing a conventional TV frame 400, which includes a viewable area 402 and a non-viewable VBI 404. The viewable area 402 and VBI 404 of the TV frame 400 each comprises a plurality of frame lines 406. The frame lines 406 of the viewable area 402 are used to display the video portion of a TV signal, while the frame lines sent between each TV video frame comprise the VBI 404. For example, the VBI 404 comprises the last 45 frame lines of each 525-line TV frame 400 in the National Television Standards Committee (NTSC) standard. The VBI 404 allows the TV time to reposition its electron beam from the bottom of the current TV frame to the top of the next TV frame. Further, since the VBI 404 is not used to transmit viewable data, the VBI 404 can be used to transmit additional data along with the viewable TV signal. Thus, the VBI 404 can be utilized to transmit supplemental content describing the main content transmitted in the viewable area 402.

Figure 5:
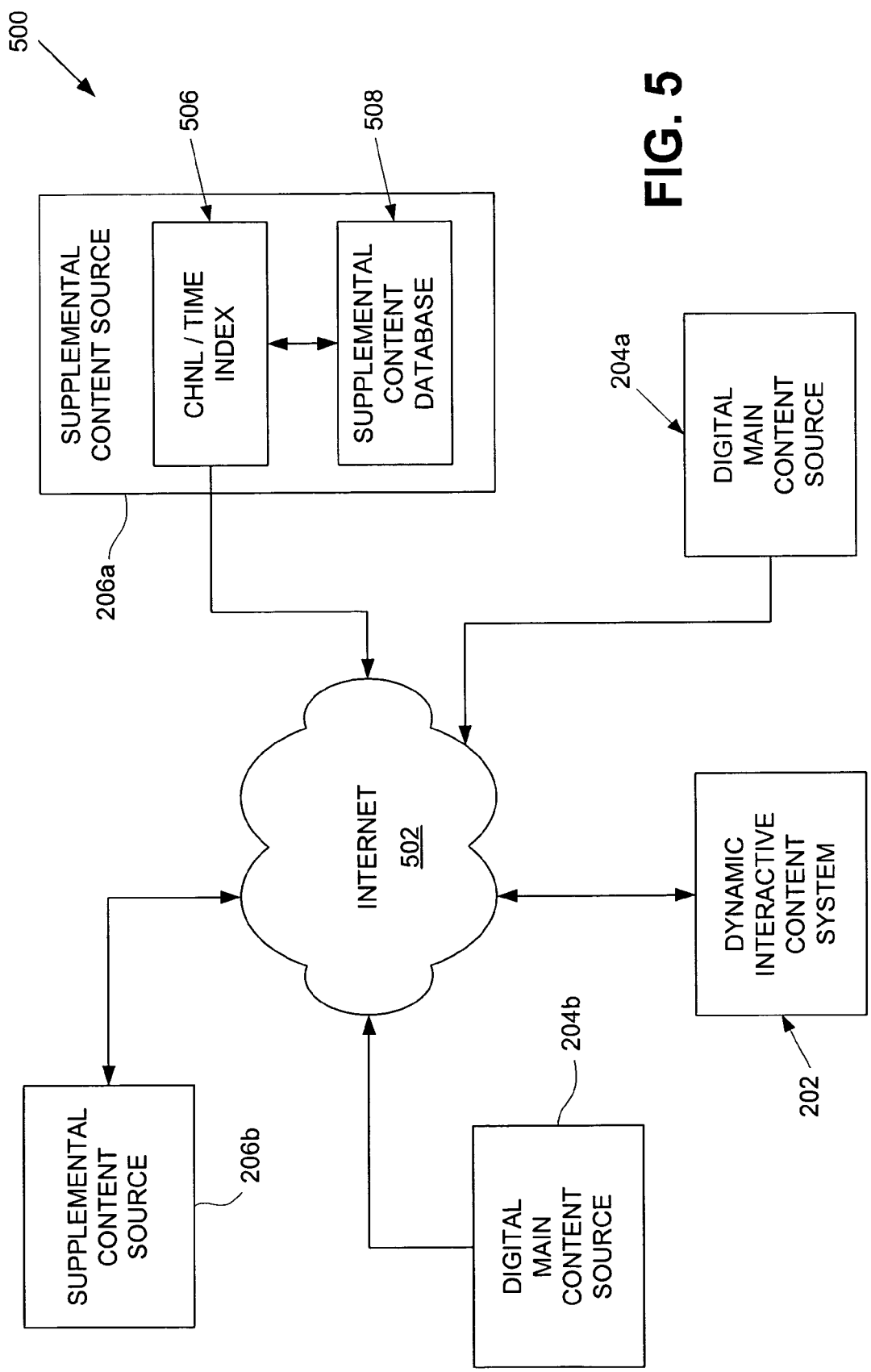
FIG. 5 is an illustration showing a network based content delivery configuration, in accordance with an embodiment of the present invention.

In addition to embedding the supplemental content in the main content signal, embodiments of the present invention can also obtain supplemental content via a network, such as the Internet. FIG. 5 is an illustration showing a network based content delivery configuration 500, in accordance with an embodiment of the present invention. Using the network based content delivery configuration 500, embodiments of the present invention can obtain supplemental content and/or main content via the network. For example, as shown in FIG. 5, the dynamic interactive content system 202 can be placed in communication with a wide area network such as the Internet 502. In addition, supplemental content sources 206*a–b* can be in communication with the Internet 502, thus allowing them to be accessed remotely by remote dynamic interactive content system 202. Using the NIC, or other network interface within the receiver, the dynamic interactive content system 202 can receive supplemental content from the network based supplemental content sources 206*a–b*. Generally, the NIC can be a printed circuit board that controls the exchange of data between network nodes at the data link level, and is utilized to for communication utilizing a computer network.

For example, a particular supplemental content source 206*a* can be a website, which can be found using a particular universal resource locator (URL). As is well know to those skilled in the art, a URL is an address that defines the route to a file on the World Wide Web or other Internet facility. In this example, the dynamic interactive content system 202 can include the URL to the supplemental content source 206*a* on the persistent storage. When needed, the CPU within the dynamic interface content system 202 can read the URL into system memory, and provide the URL to the NIC. The NIC then facilitates communication with the supplemental content source 206*a* via the Internet 502.

The supplemental content source 206*a* can include, for example, a channel and time index 506, which can be utilized to locate supplemental content for a particular related main content using a supplemental content database 508. For example, in one embodiment, the dynamic interactive content system 202 can provide a channel and time to the channel and time index 506 of the supplemental content source 206*a*. Generally, the channel and time that a particular program was broadcast will be able to sufficiently identify the main content. However, other index types can be utilized, for example, program titles, identification numbers, participant names for sporting events, and other forms of main content identification that will be apparent to those skilled in the art after a careful reading of the present disclosure.

Once the main content identification is received, in this case the channel and time for the program, the channel and time index 506 can search the supplemental content database 508 for supplemental content having a matching channel and time identification. In one embodiment, the supplemental content database 508 can comprise a database of supplemental content entries wherein the each supplement content entry includes identification fields. For example, each supplemental content entry in the supplemental content database 508 can include a channel and time identification field that is searched by the channel and time index 506. Once the matching supplemental content entry is found, the supplemental content source 206*a* can return the matching supplemental content to the dynamic interactive content system 202 via the Internet 502.

In addition, as illustrated in FIG. 5, digital main content sources 204*a–b* can be in communication with the Internet 502, thus allowing access to remote dynamic interactive content systems 202. As above, the dynamic interactive content system 202 can receive digital main content from the network based digital main content sources 204*a–b* using the NIC or other network interface within the receiver.

For example, a particular main content source 204*a* can be a website, which can be connected to using a particular URL. For example, the dynamic interface content system 202 can include the URL to the digital main content source 204*a* on the persistent storage. When needed, the CPU within the dynamic interface content system 202 can read the URL into system memory, and provide the URL to the NIC. The NIC then facilitates communication with the digital main content source 204*a* via the Internet 506.

Figure 6:
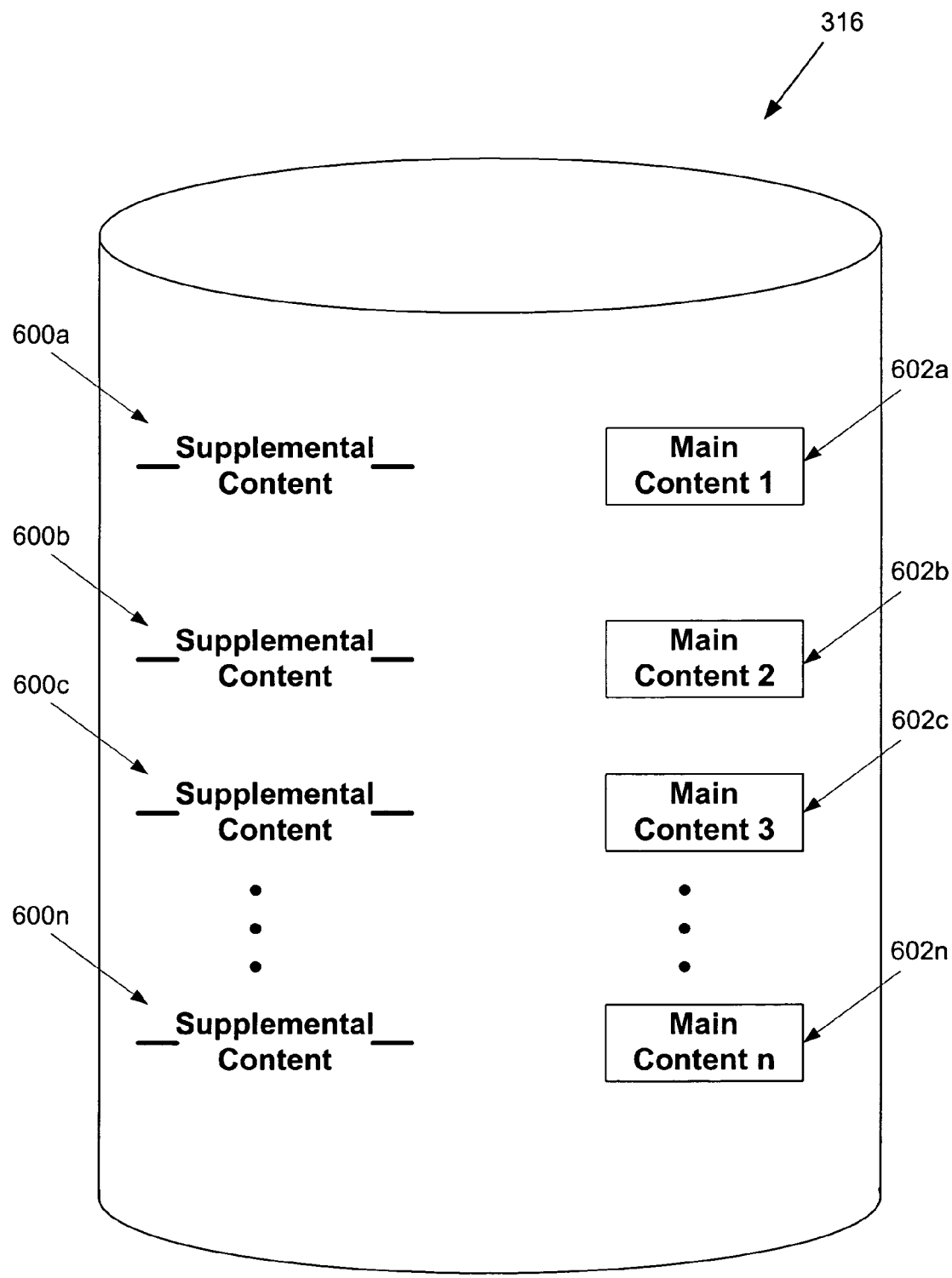
FIG. 6 is an illustration showing an exemplary persistent storage device of a dynamic interactive content system, in accordance with an embodiment of the present invention.

Once the dynamic interactive content system 202 obtains both a particular main content and the related supplemental content, the supplemental content is associated with the related main content. FIG. 6 is an illustration showing an exemplary persistent storage device 316 of a dynamic interactive content system, in accordance with an embodiment of the present invention. As shown in FIG. 6, a plurality of supplemental content entries 600*a*–600*n* and a plurality of main content entries 602*a*–602*n* are stored on the persistent storage device 316. In addition, each supplemental content entry 600*a*–600*n* is associated with a related main content entry 602*a*–602*n*. For example, supplemental content entry 600*a* is associated with main content entry 602*a*, and supplemental content entry 600*b* is associated with main content entry 602*b*.

As mentioned previously, each supplemental content entry 600*a*–600*n* provides information describing the properties, aspects, and/or characteristics of the related main content entry 602*a*–602*n*. For example, when the main content entry is a video of an auto race, the associated supplemental content may include, for example, the channel on which the auto race was broadcasts, the time of the broadcasts, information on the drivers involved, and description of the events that occurred during the race, such as when a car loses control and spins out or the end of the race. In addition, the supplemental content can include the time codes of each of these events, for example, the supplemental content can indicate that a spinout occurred fifteen minutes and twenty seconds into the race.

In this manner, embodiments of the present invention can search the supplemental content present on the system to find particular main content. For example, a user can request a list of boxing events. In this example, embodiments of the present invention can search the supplemental content entries 600*a*–600*n* to obtain a list of main content entries 602*a*–602*n* that are boxing events. Moreover, embodiments of the present invention can utilize the supplemental content entries 600*a*–600*n* to access specific scenes and events included in a particular main content file. For example, a user can request a list of boxing events wherein at least one knockdown occurred. In this example, embodiments of the present invention can search the supplemental content entries 600*a*–600*n* to obtain a list of main content entries 602*a*–602*n* that are, for example, both boxing events and include a knockdown event/scene within the entry.

This ability to search supplemental content to find specific main content stored on the persistent storage advantageously allows embodiments of the present invention to utilize the main content in conjunction with interactive applications. Referring back to FIG. 3, when running an interactive application, removable media such as a CD or DVD is placed into the removal media drive 320. The removable media drive 320 then reads data from the CD and transfers program information to the memory 306. The CPU 300, in conjunction with the GPU 304, then executes the program instructions from memory to run the program.

In addition, the operational request source 314 typically is in communication with a user input device, such as a game controller, remote controller, keyboard, or other device capable of receiving and transmitting user input data to the dynamic interactive content system 202. Output from the program executing on the CPU 300 generally is provided to the video/audio output circuitry 318 for presentation, typically on television or other monitor and speaker system. In this manner, users are able to interact with the information presented to them via the operational request source 314.

Figure 7:
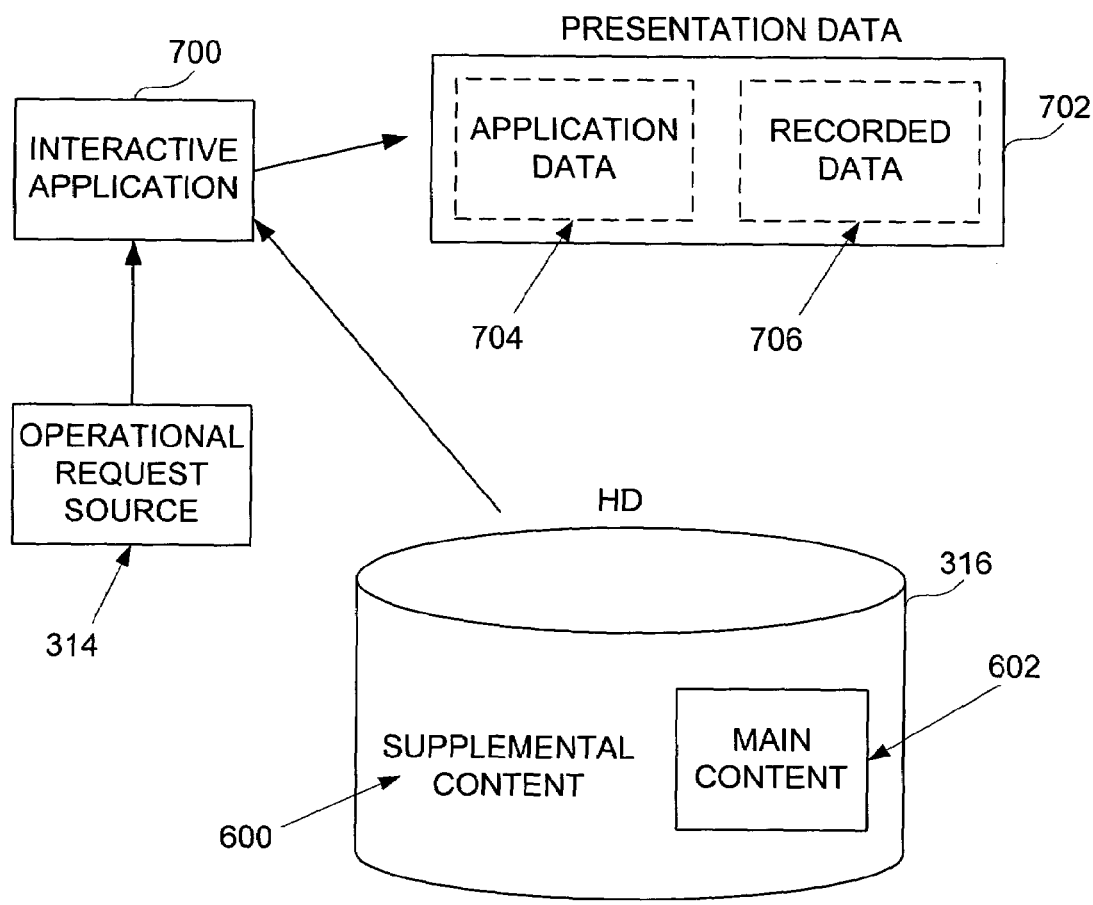
FIG. 7 is a diagram illustrating dynamic interactive application presentation, in accordance with an embodiment of the present invention.

During operation, embodiments of the present invention can utilize prerecorded main content from the persistent storage device 316 in conjunction with the interactive application. FIG. 7 is a diagram illustrating dynamic interactive application presentation, in accordance with an embodiment of the present invention. As shown in FIG. 7, embodiments of the present invention can execute an interactive application 700, as discussed above, which receives control information from the operational request source 314. As mentioned above, the operational request source 314 typically is in communication with a user input device, such as a game controller, remote controller, keyboard, or other device capable of receiving and transmitting user input data to the dynamic interactive content system.

The interactive application 700 is in communication with persistent storage device 316, and thus can read and write data to the persistent storage device 316. As a result, the interactive application 700 can utilize specified main content entries stored on the persistent storage device 316 during operation. More specifically, the interactive application 700 can search the supplemental content entries 600 on the persistent storage device 316 for main content having specific aspects, properties, and/or characteristics. Once found, the specific main content entry 602 can be read into memory from the persistent storage device 316. Once data from the main content entry 602 is in memory, the interactive application 700 can utilize the main content or a portion of the main content during its presentation to the user. That is, the presentation data 702 generated using the interactive application 700 can include both application data 704, which is generated via the interactive application data 700, and prerecorded data 706, which is obtained from the main content 602.

For example, the interactive application 700 can be an interactive football game. In this example, the interactive application 700 could, for example, after the user scores a touchdown, display video of an actual football touchdown. The interactive football application can include a default video to display. However, prior to displaying the default video, the interactive football application can search the persistent storage device 316 for video of a touchdown between football teams that are the same football teams as the user is playing. Once a matching supplemental content entry 600 is found, the interactive football application can examine the supplemental content entry 600 for the time code of the touchdown.

The interactive football application can then read the associated main content 602 into memory, and display the main content starting at the time code of the football touchdown. In this manner, the user can experience a visual display of an actual touchdown between the teams the user is playing in the game. Moreover, the video can be of a resent football game, even though the interactive football application may have been created months or years prior to the displayed football game. Further, if the interactive football application does not find supplemental data matching its request, the application can display the default video. It should be noted, that the selected data from the main content can be presented to the user in any form. For example, a video can be displayed in a small window or projected onto a three dimensional computer generated object instead of using the full screen.

In addition to video, embodiments of the present invention allow interactive applications to present still images and audio to the user. For example, an interactive application can search for a particular sound to play for the user, or for a particular image to display to the user. Moreover, as mentioned above, embodiments of the present invention enhance the user's ability to search for specific programs to watch by allowing the user to search for specific data included in the supplemental content entries. For example, the user can search for particular scenes in movies, such as car chase scenes, utilizing the embodiments of the present invention.

Embodiments of the present invention can also analyze main content for particular semantic information. Once found, a matching object from the main content can be utilized in the interactive application. For example, an application can examine a particular frame or scene of the main content for a face, using predefined semantic definitions. Once the face is found, the face data from the main content can be utilized in the interactive application, for example, the face can be displayed to the user.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A dynamic interactive content system, comprising:
    a receiver for receiving main content and supplemental content associated with the main content;
    a persistent storage in communication with the receiver, the persistent storage for storing a plurality of main content entries and associated supplemental content entries; and
    a processor for executing an interactive application having interactive application content, the processor, the receiver, and the persistent storage being part of the dynamic interactive content system, wherein the interactive application searches the stored plurality of supplemental content entries for particular supplemental content entry having particular data relevant to a particular aspect of the interactive application, and wherein the interactive application finds the main content entry based on the particular supplemental content entry found by the search, and presents a portion of the main content entry identified by the particular supplemental content entry to the interactive application for presentation along with the interactive application content.

2. A dynamic interactive content system as recited in claim 1, wherein each supplemental content entry includes data that describe properties of the associated main content entry.

3. A dynamic interactive content system as recited in claim 2, wherein the data includes a channel definition defining a channel utilized to receive the associated main content.

4. A dynamic interactive content system as recited in claim 2, wherein the data includes a time definition defining a time when the associated main content was received.

5. A dynamic interactive content system as recited in claim 2, wherein the data includes a time code for a specific event included in the associated main content.

6. A dynamic interactive content system as recited in claim 5, wherein the interactive application presents main content data beginning at a position in the main content entry specified by the time code.

7. A dynamic interactive content system as recited in claim 1, wherein the supplemental content is received via an Internet.

8. A dynamic interactive content system as recited in claim 1, wherein the supplemental content is embedded in a signal utilized to transmit the main content.

9. A dynamic interactive content system, comprising:
   a receiver for receiving main content and supplemental content associated with the main content;
   a persistent storage in communication with the receiver, the persistent storage for storing a plurality of main content entries and associated supplemental content entries;
   an operational request source in communication with a user input device, the operational request source for receiving user requests via the user input device for executing an interactive application having interactive application content; and
   a processor in communication with the persistent storage device and the operational requests source, wherein the processor searches the stored plurality of supplemental content entries for particular supplemental content entry having particular data related to a received user request made through the interactive application, and wherein the processor finds the main content entry based on the particular supplemental content entry found by the search, and presents a portion of the main content entry identified by the particular supplemental content entry to the interactive application for presentation along with the interactive application content.

10. A dynamic interactive content system, as recited in claim 9, wherein each supplemental content entry includes data that describe properties of the associated main content entry.

11. A dynamic interactive content system, as recited in claim 10, wherein the data includes a time code for a specific event included in the associated main content.

12. A dynamic interactive content system, as recited in claim 11, wherein the interactive application presents main content data beginning at a position in the main content entry specified by the time code.

* * * * *